United States Patent [19]

Wilson

[11] 4,219,339
[45] Aug. 26, 1980

[54] DIAMOND AND CUBIC BORON NITRIDE ABRASIVE COMPACTS AND CONGLOMERATES

[76] Inventor: William I. Wilson, 18 East St., East Town, Johannesburg, Transvaal, South Africa

[21] Appl. No.: 882,809

[22] Filed: Feb. 28, 1978

[30] Foreign Application Priority Data

Mar. 3, 1977 [ZA] South Africa ............ 77/1273

[51] Int. Cl.² ................................. B24D 3/06
[52] U.S. Cl. ................................. 51/307; 51/297; 51/309
[58] Field of Search ........... 51/309, 307, 297, 308, 51/295

[56] References Cited

U.S. PATENT DOCUMENTS

| | | | |
|---|---|---|---|
| 1,843,549 | 2/1932 | Firth | 51/309 |
| 2,009,598 | 7/1935 | Webster | 51/303 |
| 2,126,058 | 8/1938 | Taylor | 51/309 |
| 2,228,871 | 1/1941 | Debats | 51/309 |
| 2,323,162 | 6/1943 | Talmage | 51/309 |
| 2,906,612 | 9/1959 | Anthony et al. | 51/309 |
| 3,136,615 | 6/1964 | Bovenkerik et al. | 51/309 |
| 3,212,852 | 10/1965 | Bundy | 51/309 |
| 3,743,489 | 7/1973 | Wentorf et al. | 51/309 |
| 3,982,911 | 9/1976 | Lee | 51/309 |
| 4,063,909 | 12/1977 | Mitchell | 51/309 |

*Primary Examiner*—Donald J. Arnold
*Attorney, Agent, or Firm*—Haseltine, Lake & Waters

[57] ABSTRACT

An abrasive body for machining a workpiece including an abrasive compact comprising a mass of abrasive particles such as diamond and cubic boron nitride, present in an amount of at least 70 percent by volume of the compact, bonded into a hard conglomerate; support means covering more than 50 percent of the surface of the compact and bonded to the compact; and the compact presenting a formation, salient in relation to the support means, capable of machining the workpiece. Preferred configurations for the body are those in which the compact is sandwiched between two supports and a cylinder of compact inside a supporting sleeve.

22 Claims, 5 Drawing Figures

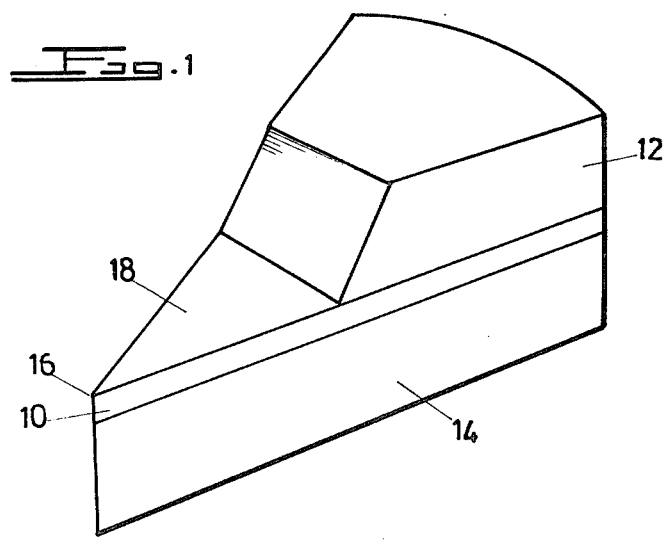
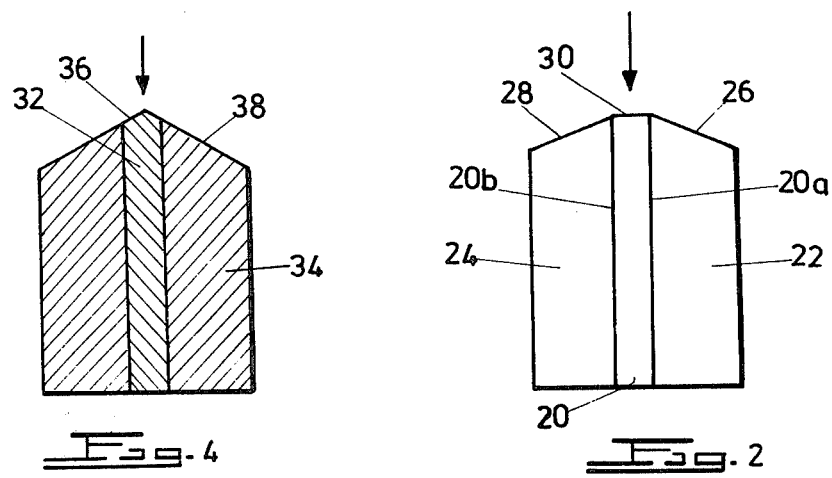
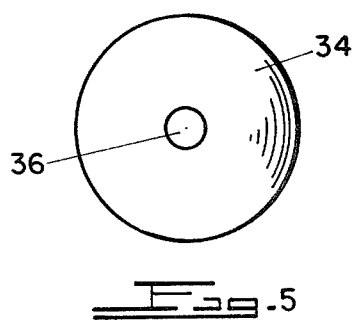
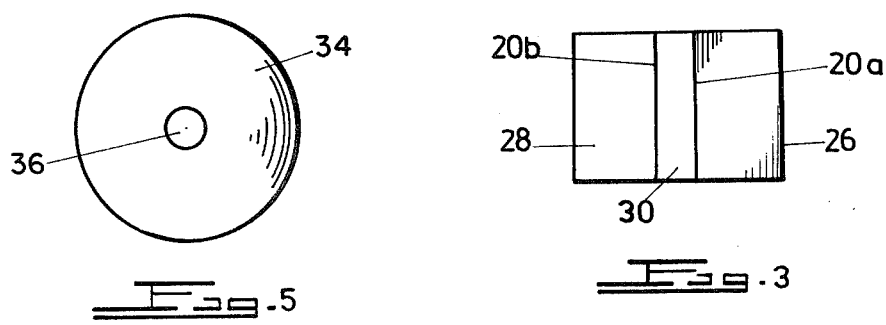

DIAMOND AND CUBIC BORON NITRIDE ABRASIVE COMPACTS AND CONGLOMERATES

THIS invention relates to abrasive bodies, and more particularly to abrasive bodies which contain abrasive compacts.

Abrasive compacts are well known in the art and consist essentially of a mass of abrasive particles, generally present in an amount of at least 70%, preferably 80 to 90% by volume of the compact, bonded into a hard conglomerate. Compacts are polycrystalline masses and can replace single large crystals. The abrasive particles of compacts are invariably super-hard abrasives such as diamond and cubic boron nitride.

Abrasive compacts, particularly diamond and cubic boron nitride compacts, may be self bonded, i.e. the individual particles of the compact may be fused and bonded together without the aid of a metal or like bonding matrix. Alternatively, stronger and more durable compacts are produced when there is a suitable bonding matrix present.

In the case of cubic boron nitride compacts, i.e. compacts in which the abrasive particle is predominantly cubic boron nitride, the bonding matrix, when provided, preferably contains a catalyst (also known as a solvent) for cubic boron nitride growth such as aluminum or an alloy of aluminum with nickel, cobalt, iron, manganese or chromium. Such catalysts tend to be soft and to minimize smearing of the catalyst during use of the compact it is preferred that the matrix also include a ceramic such as silicon nitride which is capable of reacting with the catalyst to produce a hard material.

In the case of diamond compacts, i.e. compacts in which the abrasive particle is predominantly diamond, the bonding matrix, when provided, preferably contains a solvent for diamond growth. Suitable solvents are metals of Group VIII of the Periodic Table such as cobalt, nickel or iron or an alloy containing such a metal.

For diamond and cubic boron nitride compacts the presence of a solvent or catalyst for the particular abrasive being used in the compact is desirable because then under the conditions necessary for the manufacture of such compacts intergrowth between the particles occurs. As is known in the art, diamond and cubic boron nitride compacts are generally manufactured under conditions of temperature and pressure at which the abrasive particle is crystallographically stable.

Diamond and cubic boron nitride compacts are used for the machining of metals. In use, the compacts are attached to a suitable support such as a shank to form a tool.

The compacts may be attached to a backing such as a cemented carbide backing and then the backing attached to the support to form the tool. Diamond and cubic boron nitride compacts attached to a cemented tungsten carbide backing are described and illustrated in U.S. Pat. Nos. 3,743,489 and 3,745,623 and British Patent specification No. 1,489,130.

One of the problems with diamond and cubic boron nitride compacts is their brittleness which leads to chipping of the compact during the machining of metals. It is an object of the present invention to provide an abrasive body which minimizes this problem.

According to the present invention there is provided an abrasive body for machining a workpiece including an abrasive compact comprising a mass of abrasive particles, present in an amount of at least 70 percent by volume of the compact, bonded into a hard conglomerate; support means covering more than 50 percent of the surface of the compact and attached to the compact; and the compact presenting a formation, salient in relation to the support means, capable of machining the workpiece.

The invention provides an abrasive body containing an abrasive compact in which the compact is supported more comprehensively than is the case with similar bodies of the prior art. It is preferred that at least 75 percent of the surface of the compact be covered by the support means. Falling within the scope of this general concept there are a number of possible configurations, and the preferred of which are described hereunder.

In one form of the invention, the compact presents a major surface on each of opposite sides thereof and to which the support means is attached, the support means extending over substantially the whole of one major surface and over only part of the other major surface. The major surfaces are those of largest area. In effect, the compact is sandwiched between the support means. The compact is typically wedge-shaped with the pointed end providing the salient formation.

In a second form of the invention the compact is cylindrical and located inside of and attached to a sleeve which provides the support means. This configuration is in effect a pencil.

The salient formation may take any shape suitable for the machining of a workpiece. Typically the salient formation is conical or chisel-shaped.

In yet another form of the invention the compact presents a major surface on each of opposite sides thereof and to which the support means is attached;

the support means extending across substantially the whole of each major surfaces and being cut away on adjacent edges; and the salient formation being the surface of the compact located between the cut-away edges.

The mass of the support means is preferably more than, generally very much more than, the mass of the compact. Typically, the mass of the support means is 5 to 15 times that of the compact.

In the abrasive bodies of the invention, the compact may be attached to the support means directly without the presence of an interposed metal or metal alloy braze layer in the manner illustrated and described in U.S. Pat. Nos. 3,743,489 and 3,745,623. Alternatively, the compact may be attached to the support means through a metal or metal alloy braze layer. The braze layer may be a low temperature braze or a high temperature braze of the type described and illustrated in British Pat. No. 1,489,130. In the case of cubic boron nitride compacts, when a braze layer is provided it is preferably a copper/tin/titanium braze. In the case of diamond compacts, when a braze layer is provided it is preferably zirconium.

The braze layer, when provided, is generally less than 0.5 mm, and typically in the range 50 to 500 microns, in thickness.

The invention has particular application to abrasive bodies which contain diamond and cubic boron nitride compacts as described above.

The support means is made of a high rigidity material such as high modulus steel of the M or T series or a cemented carbide. The support means is preferably made of a cemented carbide. Suitable cemented carbides are, for example, cemented tungsten carbide, cemented titanium carbide, cemented tantalum carbide and mixtures thereof. Such carbides, as is known in the art, have a metal bonding matrix usually consisting of cobalt, nickel, iron or a mixture thereof. The metal bonding matrix is usually provided in an amount of 3 to 25% by weight of the carbide.

The abrasive bodies of the invention may be made by making a compact in known manner and then attaching the support means to the compact using a suitable metal or metal alloy braze. For diamond and cubic boron nitride compacts the method generally described in British Pat. No. 1,489,130 may be used.

Direct attachment of diamond and cubic boron nitride compacts to cemented carbide support means may be achieved using the general teachings of U.S. Pat. Nos. 3,743,489 and 3,745,623.

By way of illustration embodiments of the invention will now be described with reference to the accompanying drawings, in which:

FIG. 1 is a perspective view of one embodiment;
FIG. 2 is a side elevation of a second embodiment;
FIG. 3 is a view in the direction of the arrow of FIG. 2;
FIG. 4 is a sectional side elevation of a third embodiment; and
FIG. 5 is a view in the direction of the arrow of FIG. 4.

Referring now to FIG. 1 of the drawings, there is shown an abrasive body consisting of an abrasive compact 10 sandwiched between a pair of supports 12,14. The supports 12,14 may be attached to the compact 10 either directly or through a metal or metal alloy braze layer.

The compact 10 is wedge-shaped with the pointed end 16 for providing a cutting edge for the body.

Support 14 extends across the whole of one of the major surfaces of the compact, while support 12 extends across only a part of the other major surface. In use, sharp edge 16 cuts a work-piece. Chips of the work-piece form on the table 18 and the support 12 acts as a breaker of these chips. Support 12, together with support 14, serve to act as a firm support for the compact thereby minimizing the tendency for the compact to chip or crack.

Support 12 extends from the end of the compact which is remote from the sharp end 16 and is illustrated as covering about 60 percent of the top of the compact. The extent to which this support will extend across the compact can be varied to suit the use to which the abrasive body is to be put.

The embodiment illustrated by FIGS. 2 and 3 may be used as a dressing tool. The abrasive body of this embodiment consists of an abrasive compact 20 sandwiched between a pair of supports 22,24. The compact 20 is a rectangular block having a pair of major surfaces 20a, 20b. Supports 22, 24 extend across substantially the whole of and are attached to the major surfaces 20a, 20b. Supports 22,24 are cut away on adjacent edges 26,28 respectively. The surface 30 of the compact located between the cut-away edges 26,28 provides the cutting or dressing edge of the body. In use, dressing of a workpiece may take place in the direction of the long or the short axis of the cutting surface 30.

As with the previous embodiment, attachment of the supports 22,24 to the compact 20 may take place either directly or through a metal or metal alloy braze layer.

A third embodiment is illustrated by FIGS. 4 and 5. The abrasive body of this embodiment is essentially in the form of a pencil. A cylindrical compact 32 is located inside of and attached to a supporting sleeve 34. The compact 32 has a pointed end 36 which stands proud of the cut-away, top edge 38 of the sleeve 34. As with the previous embodiments, attaching the support to the compact may take place either directly or metal through a metal or alloy braze layer. The abrasive body of this embodiment may be used for thread cutting or glass engraving.

By way of further illustration of the invention the following example may be given. A cubic boron nitride compact was made by subjecting a mixture of 80 percent by weight cubic boron nitride particles and 20 percent by weight powdered aluminum/cobalt (50/50 weight percent) alloy to conditions of temperature and pressure at which cubic boron nitride is crystallographically stable, i.e. a temperature of the order of 1600° C. and a pressure of the order of 55 to 60 kilobars. These elevated conditions were maintained for a period of 3 to 5 minutes. The temperature was allowed to return to ambient conditions and the pressure was released. The compact produced was in the form of a circular disc. This disc was then cut into three 60 degree segments. A cemented tungsten carbide support (cobalt binder), also in the form of a 60 degree segment, was then attached to each of the two major surfaces of each segment. This was achieved by means of a copper/tin/titanium brazing alloy. The brazing alloy in powdered form was deposited on a major surface of a segment, a cemented tungsten carbide support then placed on the powdered alloy, and the whole heated to a temperature of about 900° C. under vacuum for a period of about 10 minutes.

One of the cemented carbide supports of each segment was polished away, starting from the pointed end of the segment and working backwards. The abrasive bodies so produced had the configuration illustrated by FIG. 1 of the accompanying drawings. For each body, the mass of the cemented tungsten carbide supports together was about 10 times that of the compact.

I claim:

1. An abrasive body for abrading or machining a workpiece including an abrasive compact comprising a mass of diamond or cubic boron nitride abrasive particles, present in an amount of at least 70 percent by volume of the compact, bonded into a hard conglomerate; support means of high rigidity covering more than 50 percent of the surface of the compact and attached to the compact; the compact presenting a major surface on each of opposite sides thereof and to which the support means is attached, the support means extending over substantially the whole of the one major surface and over at least a part of the other major surface; and the compact presenting a formation salient in relation to the support means, capable of abrading or machining the workpiece.

2. An abrasive body according to claim 1 wherein the support means covers at least 75 percent of the surface of the compact.

3. An abrasive body according to claim 1 wherein the compact is wedge-shaped.

4. An abrasive body according to claim 1 wherein the salient formation is chisel-shaped.

5. An abrasive body according to claim 3 wherein the salient formation is chisel-shaped.

6. An abrasive body according to claim 1 wherein the support means extends across substantially the whole of both major surfaces and is cut away on adjacent edges; and the salient formation is the surface of the compact located between the cut-away edges.

7. An abrasive body according to claim 1 wherein the mass of the support means is more than that of the compact.

8. An abrasive body according to claim 7 wherein the mass of the support means is 5 to 15 times that of the compact.

9. An abrasive body according to claim 6 wherein the mass of the support means is more than that of the compact.

10. An abrasive body according to claim 9 wherein the mass of the support means is 5 to 15 times that of the compact.

11. An abrasive body according to claim 1 wherein the compact is attached to the support means directly without the presence of an interposed metal or alloy bonding layer.

12. An abrasive body according to claim 1 wherein the compact is attached to the support means through a metal or metal alloy braze layer.

13. An abrasive body according to claim 12 wherein the braze layer is less than 0.5 mm in thickness.

14. An abrasive body according to claim 12 wherein the braze layer is 50 to 500 microns in thickness.

15. An abrasive body according to claim 1 wherein the abrasive compact is a cubic boron nitride compact.

16. An abrasive body according to claim 15 wherein the compact includes a matrix which comprises a catalyst for cubic boron nitride growth.

17. An abrasive body according to claim 16 wherein the catalyst is selected from aluminum and an aluminum alloy.

18. An abrasive body according to claim 1 wherein the compact is a diamond compact.

19. An abrasive body according to claim 18 wherein the compact includes a matrix which comprises a solvent for diamond growth.

20. An abrasive body according to claim 19 wherein the solvent is cobalt.

21. An abrasive body according to claim 1 wherein the support means is made of cemented carbide.

22. An abrasive body according to claim 6 wherein the support means is made of cemented carbide.

* * * * *